Dec. 18, 1956   C. R. HARMON ET AL   2,774,640
COLLAPSIBLE REAR SEAT SERVICE TRAY FOR AUTOMOBILES
Filed July 5, 1955
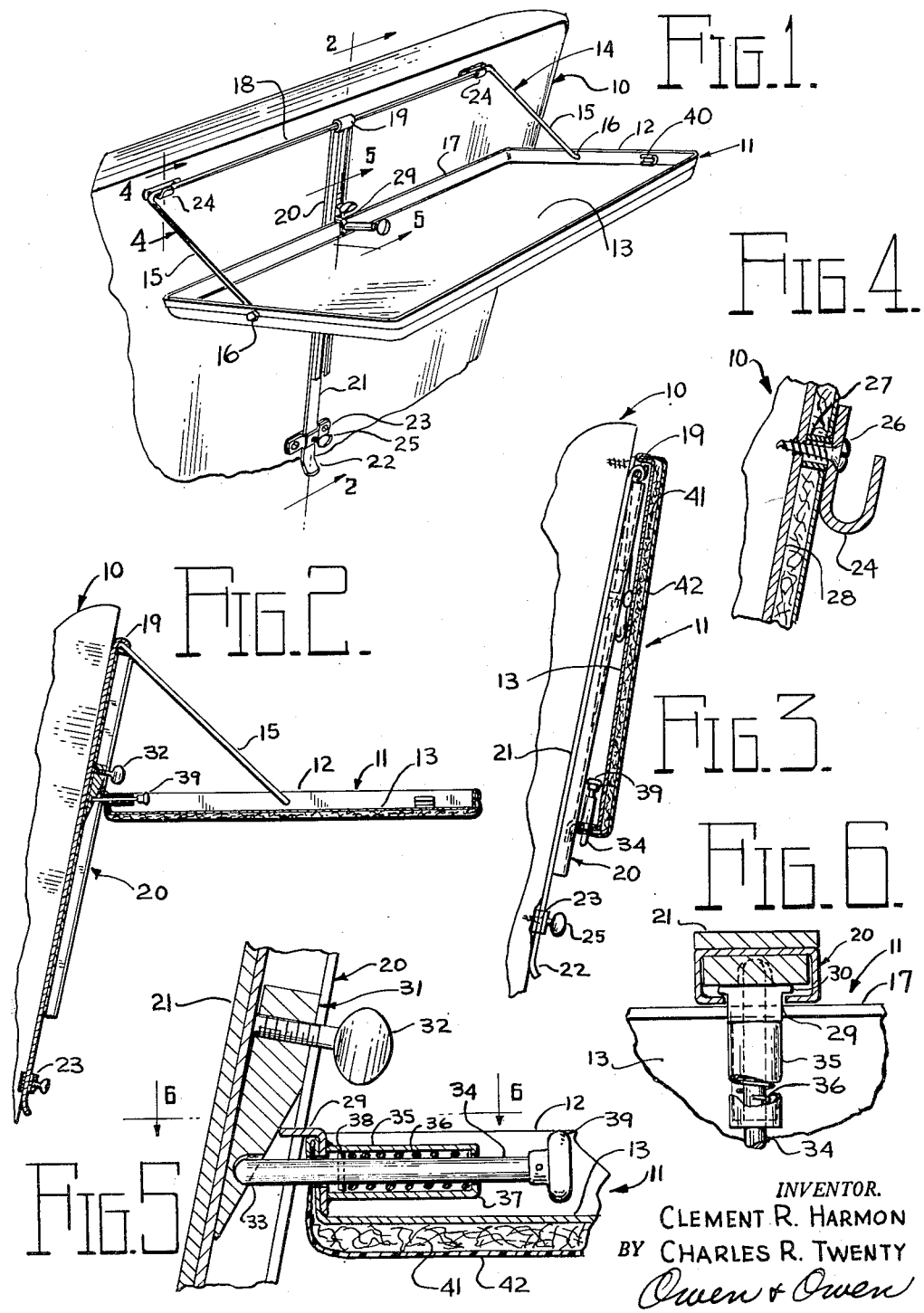
INVENTOR.
CLEMENT R. HARMON
BY CHARLES R. TWENTY
Owen & Owen
ATTORNEYS

United States Patent Office 2,774,640
Patented Dec. 18, 1956

2,774,640

COLLAPSIBLE REAR SEAT SERVICE TRAY FOR AUTOMOBILES

Clement R. Harmon and Charles R. Twenty, Toledo, Ohio

Application July 5, 1955, Serial No. 519,722

5 Claims. (Cl. 311—21)

This invention relates to automobile service trays and, more particularly to a tray designed to be removably mounted on the back of the front seat of an automobile and having support and mounting means which facilitate its movement from an upper, open position to a closed position in which it is closely adjacent the back of the front seat so that it is not obtrusive and so that it does not obstruct entry and exit of passengers into and out of the rear seat of the automobile.

More particularly, the service tray of the invention is so designed as to provide a utility surface which is uppermost when the tray is in service position and which is turned inwardly when the tray is returned to its closed position so that the other side of the tray may be suitably upholstered or padded so as to blend into the automobile upholstery and to prevent injury to the knees or other parts of the body of a passenger who may be thrown or otherwise come into contact with the tray. The structure of the tray is such that all projections, hooks, etc., which might catch upon the clothing of passengers also are completely hidden when the tray is in its closed position.

The foregoing advantages of a tray embodying the invention and the mode of their achievement will be better understood from the specification which follows and from the drawings in which:

Fig. 1 is a view in perspective showing a tray embodying the invention in its open or service position on the back of the front seat of an automobile fragmentarily shown in the figure.

Fig. 2 is a transverse, vertical, sectional view taken substantially along the line 2—2 of Fig. 1 and illustrating the tray in its open or service position.

Fig. 3 is a view similar to Fig. 2 but showing the tray in closed position.

Fig. 4 is a greatly enlarged, fragmentary, detailed, sectional view taken substantially along the line 4—4 of Fig. 1.

Fig. 5 is a fragmentary, vertical, sectional view also on an enlarged scale, and taken along the line 5—5 of Fig. 1.

Fig. 6 is a fragmentary, horizontal, sectional view taken generally along the line 6—6 of Fig. 5.

A tray embodying the invention is adapted to be removably mounted on the back of the automobile front seat generally indicated at 10. A tray 11 has a marginal lip 12 and a flat body 13. The tray 11 is supported both in its open (Fig. 2) and closed (Fig. 3) positions by a bail 14 having paralle arms 15, the lower ends of which are turned horizontally as hooks and engaged in suitable holes 16 punched or drilled through the side portions of the lip 12 and equidistantly spaced from a rear or lower lip 17. The bail 14 has a cross bar 18 extending through an eye 19 located on the uppermost end of a guide channel 20. The guide channel 20 is substantially C-shaped in cross section (Fig. 6) and is welded or otherwise secured to a vertically extending bar 21, the lower end of which has a curved foot 22.

The tray 11, its support bail 14 and the channel 20 are all removably mounted on the seat 10 by the engagement of the foot 22 in a guide clip 23 and the engagement of the cross bar 18 of the bail 14 in a pair of support hooks 24. The guide bar 23 is permanently fixed to the back of the seat 10 at a central lower location and has a thumb nut 25 which can be tightened against the bar 21 after the bar 21 is inserted through the guide 23. Each of the hooks 24 (see also Fig. 4) is permanently mounted on the back of the seat 10, for example, by metal cutting screws 26 which extend through spacing ferrules 27 and are screwed into the metal inner framepiece 28 of the seat 10. The guide 23 may be similarly mounted, although the mounting is not shown in detail.

The tray is positioned in the automobile by sliding the curved foot 22 through the guide 23, swinging the bail 21 up against the rear of the seat 10 and moving the assemblage downwardly until the cross bar 18 catches in the hooks 24. The thumb nut 25 is then tightened to prevent vertical movement of the assemblage and consequent disengagement of the cross bar 18 from the hooks 24.

At the center rear of the rear lip 17 there is welded or otherwise secured a tang 29 (Figs. 5 and 6) having a T-shaped end 30 extending between the arms of the channel 20 and engaged therewith. The tang 29 serves as a guide for the vertical movement of the rear edge 17 of the tray 11 and prevents the tray 11 from being moved backwardly away from the channel 20. A stop block 31 of such size that it fits within the guide channel 20 has a locking thumb screw 32 which is threaded through the block 31 and extends outwardly between the arms of the guide channel 20. The block 31 also has a socket 33 for the reception of the rear end of a spring pressed plunger 34. The plunger 34 extends forwardly through a guide tube 35 secured to the tang 29 and containing a coil spring 36 which surrounds the plunger 34 and is compressed between a return lip 37 on the tube 35 and a transverse pin 38 extending through the plunger 34. A knob 39 is pinned or otherwise secured on the forward end of the plunger 34 to permit the fingers of a user to withdraw the plunger 34 from the socket 33.

Because the angle relative to the horizontal of the back surfaces of the front seats of automobiles varies in different models of automobiles, in order for the tray 11 to be horizontal in its open position it is necessary to place the stop block 31 at different vertical positions in the channel 20 depending upon this inclination. The guide block 31 may be slid vertically in the channel 20 and locked in the appropriate position by its thumb nut 32 so that when the tray 11 is swung to open position and the plunger 34 engaged in its socket 33, the tray 11 will be horizontal as shown in Fig. 2.

When it is desired to close the tray, the knob 39 is pulled, disengaging the plunger 34 from the socket 33 and the rear edge of the tray 17 swung downwardly. The tang 29 slides along the channel 20 and the side arms 15 of the bail 14 swing angularly in a clockwise direction (Fig. 2) which swings the front edge of the tray 11 forwardly and upwardly as its rear edge moves downwardly. This swings the entire assemblage into the position of Fig. 3. The assemblage is held in the position of Fig. 3 by the engagement of the upper portions of the side arms 15 with a pair of clips 40, one of which is shown in Fig. 1 and which are welded or otherwise secured on the inner sides of the side portions of the lip 12. When the tray is moved to the closed position of Fig. 3, the clips 40 frictionally engage or embrace the outer sides of the side arms 15 of the bail 14.

Movement of the tray 11 to the closed position of Fig. 3 encloses the entire bail 14, its support hooks 24 and the upper ends of the channel 20 and support bar 21 and its eye 19 and the horizontal arm 18 of the bail 14 within the enclosure formed by the lip 12 of the tray 11 and its body 13. Movement to this position also swings the underside of the tray to the back or exposed position. As can best be seen in Figs. 2, 3 and 5, the back side of the tray may be suitably upholstered with cushioning material generally indicated at 41 and covered with a layer of fabric or other upholstery material 42 to blend with the upholstery on the surface of the seat 10.

We claim:

1. A collapsible service tray comprising a centrally disposed vertical guide channel, a rectilinear tray, a guide member on one edge of said tray and movable along said channel, swinging support means pivotally connected to each side of said tray on a pivot line parallel to but removed from said first edge of said tray, means for attaching to a vertical surface the lower end of said guide channel and the upper ends of said support means, adjustable locking means carried in said centrally disposed channel, and a spring pressed plunger cooperating with said locking means and carried on said tray.

2. A tray according to claim 1 in which the support means is a bail having spaced arms pivotally connected to said tray at their ends and a cross bar pivotally mounted at the upper end of said guide channel.

3. A tray according to claim 2 in which the support bail has a straight cross bar mounted on a pivot line parallel to the pivot line of the ends of the arms thereof in said tray and the permanently mounted support means includes hooks in which said cross bar is hung.

4. A collapsible automobile service tray comprising a rectilinear tray, a vertical guide bar adapted to be removably mounted on the back of the front seat of an automobile, means at the center of one of the edges of said tray slidingly engageable with said guide bar, a support bail for said tray, said bail having a cross bar that is pivotally mounted at the upper end of said guide bar and a pair of spaced parallel arms, the ends of which are pivotally connected to the sides of said tray on a pivot line parallel to the pivot line of said cross bar and spaced from said first one of said edges of said tray, and means permanently mounted on said automobile seat for detachably supporting said bail and said guide bar.

5. In a service tray according to claim 4 a sliding stop block adjustably positionable on said guide bar and cooperating means on the rear edge of said tray for latching said tray in position determined by the vertical position of said stop block.

References Cited in the file of this patent

UNITED STATES PATENTS

| | | |
|---|---|---|
| 969,615 | Frederick | Sept. 6, 1910 |
| 1,564,358 | Klein | Dec. 8, 1925 |
| 1,790,468 | Frank et al. | Jan. 27, 1931 |
| 1,809,866 | Riesche | June 16, 1931 |
| 2,173,569 | Troendle | Sept. 19, 1939 |
| 2,211,962 | Morris | Aug. 20, 1940 |
| 2,556,724 | Hubsch | June 12, 1951 |
| 2,619,395 | Kent | Nov. 25, 1952 |
| 2,687,336 | Smith et al. | Aug. 24, 1954 |
| 2,726,125 | Martin | Dec. 6, 1955 |